United States Patent
Maurice

(10) Patent No.: US 6,252,566 B1
(45) Date of Patent: Jun. 26, 2001

(54) COMPENSATION PROCESS FOR A DISTURBED CAPACITIVE CIRCUIT AND APPLICATION TO MATRIX DISPLAY SCREENS

(75) Inventor: François Maurice, Grenoble (FR)

(73) Assignee: Thomson-LCD, Paris (FR)

( * ) Notice: Subject to any disclaimer, the term of this patent is extended or adjusted under 35 U.S.C. 154(b) by 0 days.

(21) Appl. No.: 09/088,628

(22) Filed: Jun. 2, 1998

(30) Foreign Application Priority Data

Jun. 5, 1997 (FR) .................................................. 97 06940

(51) Int. Cl.$^7$ ....................................................... G09G 3/20
(52) U.S. Cl. .............................. 345/55; 345/99; 345/100; 345/101
(58) Field of Search .................................... 345/98, 99, 92, 345/58, 100, 214, 87, 94, 89, 101; 326/30; 349/55

(56) References Cited

U.S. PATENT DOCUMENTS

| | | | |
|---|---|---|---|
| 5,132,819 | * | 7/1992 | Noriyama et al. ....................... 349/55 |
| 5,583,533 | * | 12/1996 | Moriyama ................................ 345/94 |
| 5,701,136 | * | 12/1997 | Huq et al. ................................ 345/100 |
| 5,726,678 | * | 3/1998 | Dingwall ................................. 345/100 |
| 5,774,100 | * | 6/1998 | Aoki et al. ............................... 345/87 |
| 5,841,411 | * | 11/1998 | Francis ..................................... 345/58 |
| 5,939,896 | * | 8/1999 | Hedberg ................................... 326/30 |
| 5,940,057 | * | 8/1999 | Lien et al. ............................... 345/89 |

FOREIGN PATENT DOCUMENTS

| | | | |
|---|---|---|---|
| 542 307 A2 | 5/1993 | (EP) | ................................. G09G/3/36 |
| 564 263 A2 | 10/1993 | (EP) | ................................. G09G/3/36 |
| 570 001 A2 | 11/1993 | (EP) | ................................. G09G/3/36 |
| 572 079 A2 | 12/1993 | (EP) | ............................. G02F/1/1335 |
| 731 442 A2 | 9/1996 | (EP) | ................................. G09G/3/36 |
| WO9500874 | 1/1995 | (WO) | ............................... G02F/1/133 |

* cited by examiner

Primary Examiner—Steven Saras
Assistant Examiner—Fritz Alphonse
(74) Attorney, Agent, or Firm—Joseph S. Tripoli; Harvey D. Fried; Sammy S. Henig

(57) ABSTRACT

A compensation process for a circuit comprising at least one first conductor at a specified potential, at least one second conductor generating disturbances by capacitive coupling to the conductor and at least one disturbance compensation bus capacitively coupled to the first conductor by a first capacitor includes the steps of measuring the voltage and the current on the compensation bus, calculating the voltage on the first disturbed conductor, and determining the set-point voltage to be applied to the compensation bus in order to compensate for the disturbance.

10 Claims, 2 Drawing Sheets

COMPENSATION PROCESS FOR A DISTURBED CAPACITIVE CIRCUIT AND APPLICATION TO MATRIX DISPLAY SCREENS

BACKGROUND OF THE INVENTION

The present invention relates to a compensation process for a disturbed capacitive circuit, more particularly to a compensation process for a circuit comprising at least one conductor at a specified potential, at least other conductors generating disturbances by capacitive coupling to the said conductor and a disturbance compensation bus capacitively coupled to the said conductor.

The present invention also relates to an application of this process to matrix-drive display screens. It therefore relates to a device for compensating potential for a display screen driven by an electrode array arranged in matrix fashion. It is more particularly relevant to liquid crystal screens, but other screens of the same type may also be used.

The present invention will be described by referring to a matrix-drive display screen, but it can be applied to all disturbed capacitive systems which require compensation, the latter being effected without adding a special measurement line.

In the case of a matrix-drive display screen, the latter consists, in the known manner, of a set of lines and of a set of parallel columns which are activatable, and are arranged perpendicular to one another. This type of screen can operate sequentially, the lines being activated one after the other, while the data are displayed on the columns or vice versa. In the case of line by line sequential operation, the line drive circuit imposes a first selection potential on the chosen line, the other lines being taken to a reference potential. For some of the duration corresponding to the line drive, the column drive circuits impose, on all the columns, a potential dependent on the data to be displayed, and therefore all the column drive circuits change state simultaneously. The simultaneous changes of state therefore produce a capacitive coupling between lines and columns which is all the stronger the larger the difference between drive impedance and load impedance in favour of the latter.

Thus, various solutions have been proposed for compensating for the capacitive couplings between the lines and columns of a matrix screen which uses line or column drive devices, more particularly those exhibiting a high or medium output impedance.

A compensation circuit of this type is described, for example, in French Patent Application No. 94 05987 filed on May 17, 1994 in the name of THOMSON-LCD. In this case, as represented in FIG. 1, an additional electrode is used, namely a column f capacitively coupled by capacitors $Cf_j$ to each of the lines of the screen as well as an additional line g, also capacitively coupled to the columns of the screen, which it crosses in order to effect the compensation. More specifically, FIG. 1 diagrammatically a display screen with matrix array comprising columns i represents (i varying from 1 to n) and lines j (j varying from 1 to m) which are driven by line drive circuits Dj-1 for line j-1, Dj for line j and Dj+1 for line j+1. The column drive circuits i-1, i, i+1 are not represented in the drawing.

In this case, when the output of a line drive circuit Dj of a selection line j is not at low impedance, non-negligible capacitive couplings are brought about by the capacitors labelled Cij (i varying from 1 to n and j varying from 1 to m) between the lines i (i varying from 1 to n) and the columns j (j varying from 1 to m). These capacitive couplings may induce unacceptable voltages on the lines which may even cause a change of state of the transistors located, in the known manner, at the intersections of the lines and columns of the active matrix when the columns are quiescent.

Thus, as represented in FIG. 1, to remedy this drawback and compensate for the couplings, an additional column f is provided, capacitively coupled by the capacitors Cfj to each of the lines j (j varying from 1 to m) of the screen. The value of the capacitor Cfj is chosen to be almost equal to the sum of the coupling capacitances Ci between a line and the columns which they cross. The column f can be activated with each change of polarity on the columns, such as during frame reversals or line reversals for example. Moreover, as represented in FIG. 1, another possible means of driving the column f is to associate therewith, across a comparator 1, a line g capacitively coupled by the capacitors Cgi to the columns i (i varying from 1 to n) which it crosses. This line g makes it possible to detect the couplings with the columns of the screen and to correct the potential of column f by virtue of the capacitive coupling Cfg between column f and line g. In this case, two additional electrodes are necessary, namely the line g for measuring the imbalance due to the capacitive coupling and the column f for compensating for this imbalance.

SUMMARY OF THE INVENTION

The purpose of the present invention is to propose an enhancement to the above device whereby it is possible to use just a single additional electrode or bus so as simultaneously to measure the imbalance and compensate for this imbalance. The use of a single bus makes it possible, especially for display screens, to limit their size, since the coupling capacitors such as Cfj and Cgi require a considerable area when they are made on the matrix itself.

Accordingly, the subject of the present invention is a compensation process for a circuit comprising at least one first conductor at a specified potential, at least one second signal conductor generating disturbance by capacitive coupling to the conductor and at least one disturbance compensation bus capacitively coupled to the said first conductor by a first capacitor ($C_1$), characterized by the following steps:

measurement of the voltage ($V_{comp}$) and of the current ($I_{comp}$) on the compensation bus;

calculation of the voltage ($V_{dist}$) on the first disturbed conductor, and determination of the set-point voltage to be applied to the compensation bus in order to compensate for the disturbance.

According to a preferred embodiment, the value of the voltage on the first disturbed conductor is given by the following formula:

$$V_{dist} = \left[ V_{comp} + \int \frac{I_{comp} dt}{C_1} \right]$$

The value of integral $\int I_{comp} dt$ is calculated from observation of the value of the voltage across the terminals of a second capacitor ($C_2$) which is in series with the compensation bus and through which the same current $I_{comp}$ flows.

The subject of the present invention is also a display screen comprising an array of electrodes arranged in matrix fashion in lines and in columns, a coupling capacitor being associated with each line/column crossing, line and column drive circuits and at least one additional conductor bus crossing all the lines and capacitively coupled to each of them in such a way that the corresponding coupling capacitance has a value of the same order of magnitude as the sum of the coupling capacitances between a line or column and the columns or the lines which it crosses, characterized in that it uses a compensation process such as described above.

Preferably, this screen comprises a circuit for compensating the imbalances due to the line/column capacitive couplings during the drive phases, the input and output of which are coupled to the said additional bus.

BRIEF DESCRIPTION OF THE DRAWINGS

Other characteristics and advantages of the present invention will emerge on reading the preferred embodiment given with reference to the appended drawings, in which.

To simplify the description, in the figures, the same elements bear the same references, in particular the capacitor $C1=\epsilon(Cej+Ce'j)$ j varying from 1 to n in FIG. 2.

DESCRIPTION OF PREFERRED EMBODIMENTS

There now follows a succinct description of the compensation process for a circuit comprising at least one first conductor at a specified potential, at least one signal generator which generates disturbances on the conductor and a disturbance compensation bus capacitively coupled to the said first conductor by one and the same capacitor $C_1$. The process will be explained while referring in part to FIG. 3. Firstly, the current $I_{comp}$ and the voltage $V_{comp}$ on the additional bus or compensation line are measured. From this measurement it is possible to deduce the voltage $V_{dist}$ of the disturbed lines, since the capacitors $C_1$ have known and specified values.

Thus, since $Q=CV$ this gives the formula:

$$(V_{dist}-V_{comp})C_1 = \int I_{comp} dt$$

whence $$V_{dist} = V_{comp} + \int \frac{I_{comp} dt}{C_1}$$

The value of $\int I_{comp} dt$ is measured by a capacitor $C_2$ which is chosen in such a way that its value is greater than $C_1$. $\int I_{comp} dt = C_2(V_{comp}-V_s)$, $V_s$ being the voltage on the other terminal of the capacitor $C_2$.

$$V_{dist} = V_{comp} + \frac{C_2}{C_1}(V_{comp} - V_s)$$

whence $$V_s = V_{comp} + (V_{comp} - V_{dist})\frac{C_1}{C_2}$$

To compensate for the coupling, use is made of a resistive divider $R_2$, $R_1$ linked to a reference voltage $V_{ref}$, the voltage between R2 and $R_1$ being labelled V. When the circuit is in a stable operating zone, that is to say when the points 3 and 4 are at the same potential: $V_{comp}=V$, giving the formula:

$$V_s = V + \left(V - \frac{V_{ref}}{R_1}\right)R_2$$

$$V_s = V_{comp} + (V_{comp} - V_{ref})\frac{R_2}{R_1}$$

whence if we make $$\frac{R_2}{R_1} = \frac{C_1}{C_2}$$

then $V_{ref}=V_{dist}$

It may be seen that the circuit allows control of the voltage of the disturbed conductor $V_{dist}$ by the reference voltage $V_{ref}$. The circuit acts on the compensation bus so as to make these voltages equal.

Figure 3:
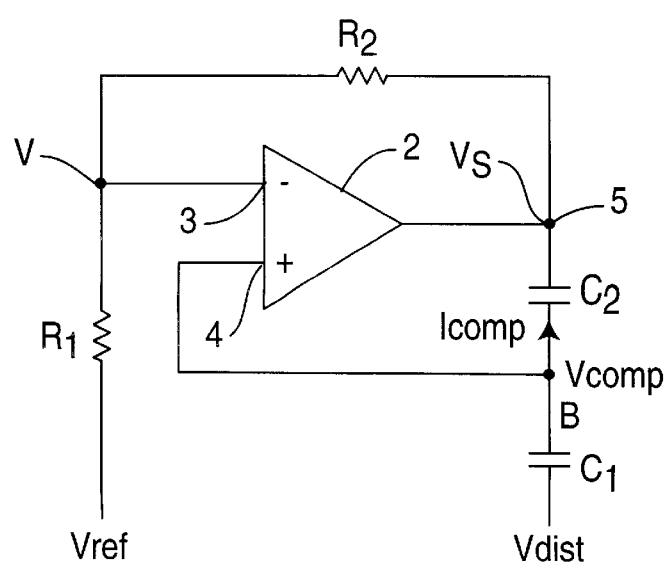
FIG. 3 represents an embodiment of the compensation circuit in accordance with the invention.

The equality of the voltages at the middle of the divider bridges is obtained using an amplifier, as represented in FIG. 3.

Figure 1:
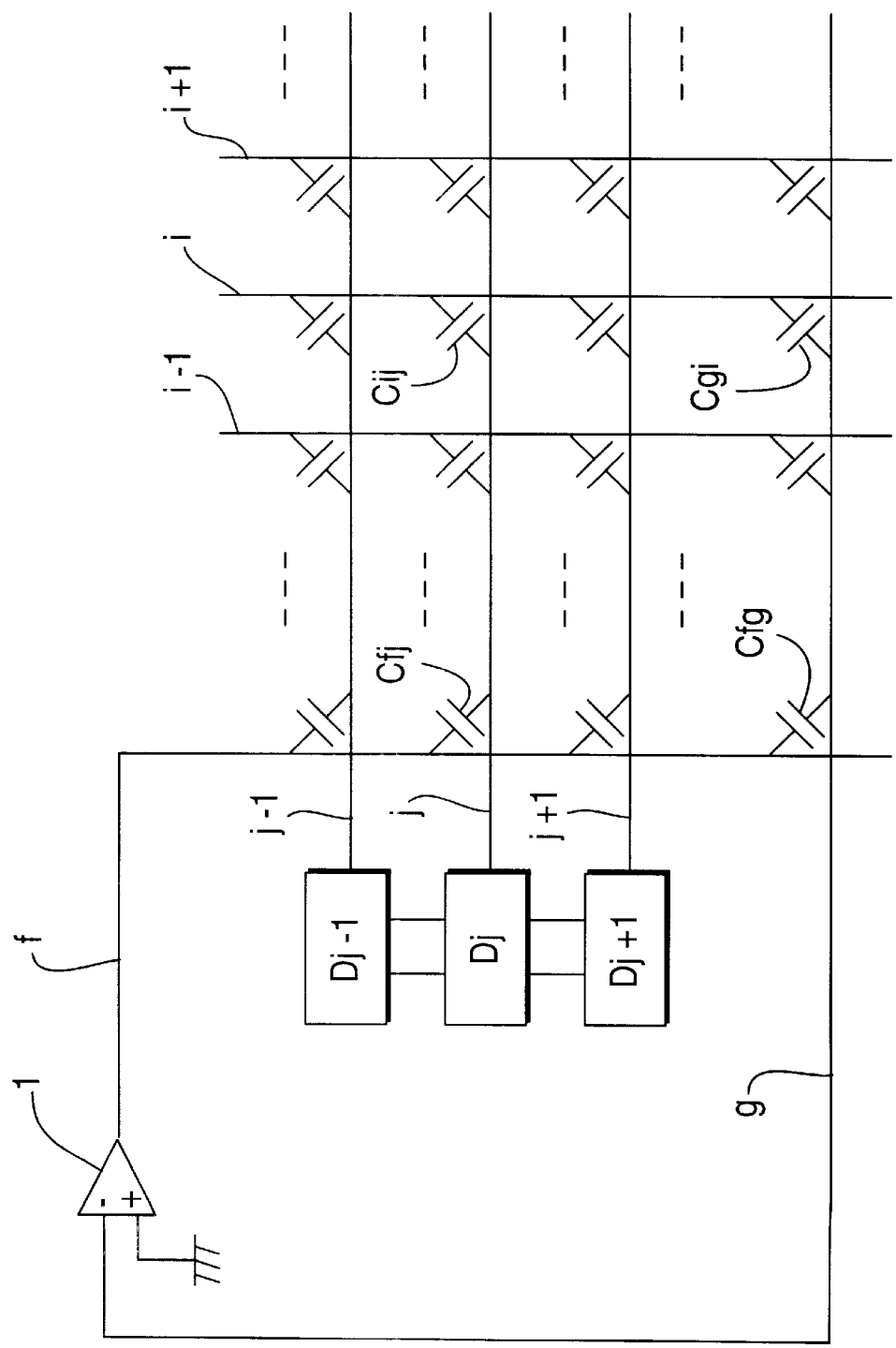
FIG. 1, already described, represents diagrammatically a display screen of matrix type equipped with a device for compensating potential in accordance with the prior art.
Figure 2:
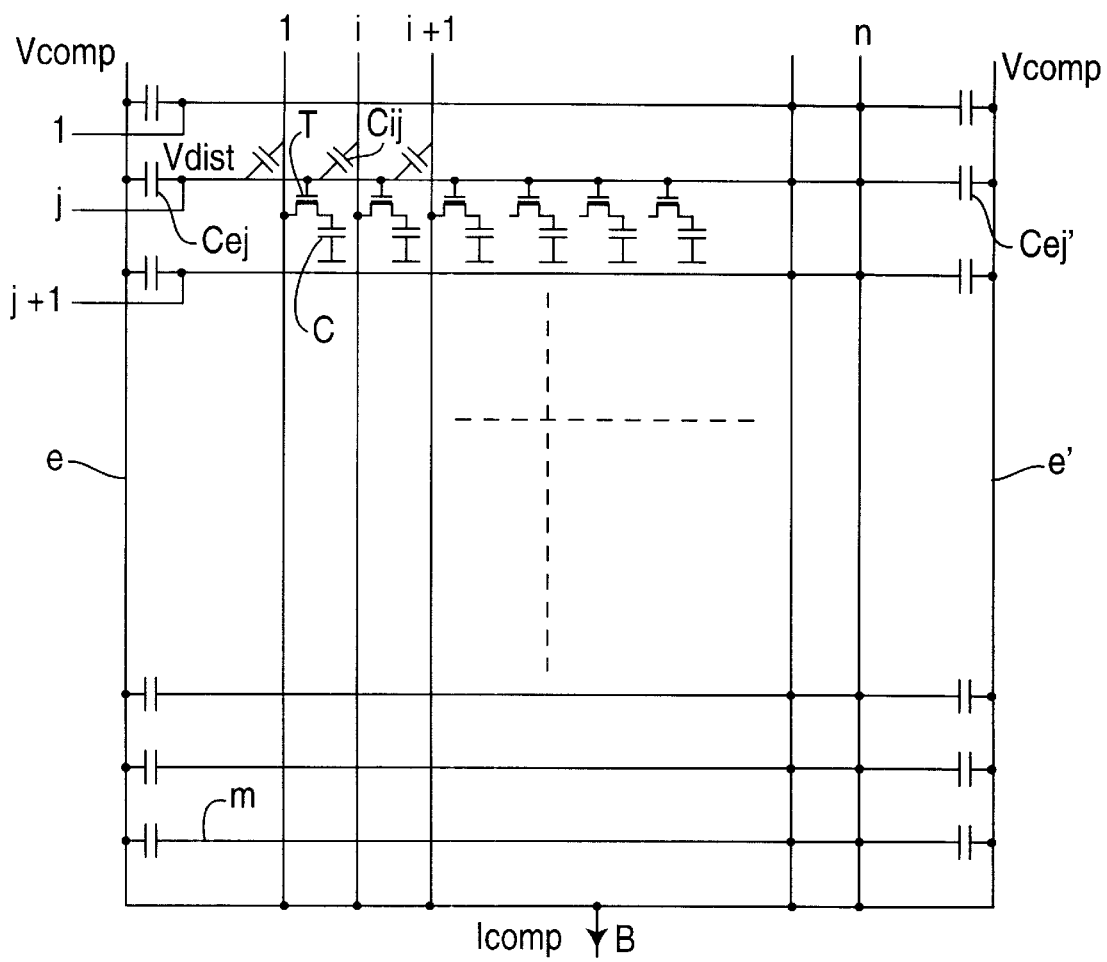
FIG. 2 represents diagrammatically a display screen with matrix array equipped with at least one additional electrode which measures and compensates for the imbalance.

A matrix-array display screen will now be described with reference to FIG. 2, more particularly a liquid crystal screen equipped with additional buses or electrodes in accordance with the present invention. This screen uses the process described above.

This display screen consists of a matrix array of lines 1, j, j+1 . . . m and columns 1, i, i+1 . . . n arranged perpendicular to one another. Provided at the crossover of each line and each column is a drive transistor T, in general a thin-film transistor, which drives the pixel symbolized by a capacitor C. The lines 1, j, j+1 . . . m are connected in the known manner to line drive circuits (not represented) while the columns 1, i, i+1 . . . n are connected in the known manner to column drive circuits (not represented). As described above, when the outputs of the line drive circuits are not at low impedance, non-negligible capacitive couplings (represented by the capacitors Cij) exist between the lines and columns. Additionally, to remedy this drawback and as represented in FIG. 2, at least one additional bus is provided (two in the embodiment represented). These additional buses e, e' are made parallel to the columns 1, i, i+1 . . . n and are capacitively coupled by the capacitors Cej, Ce'j to each of the lines 1, j, j+1 . . . m of the screen. In the embodiment represented in FIG. 2, the sum of the capacitances of a line (Cej+Ce'j) must be almost equal to the sum of the coupling capacitances Cij (i varying from 1 to n) between a specified line j and the columns 1, i, i+1 . . . n which it crosses. In the embodiment represented, the two additional buses e, e' are linked together at the point B, the point B being linked to a compensation circuit, a preferred embodiment of which is represented in FIG. 3.

As represented in FIG. 3, the compensation circuit allowing compensation of the imbalances due to the line/column capacitive coupling during the matrix screen drive phases, consists of an operational amplifier 2, one of the inputs of which, namely the negative input 3, is linked via an impedance, namely the resistor R1 in the embodiment represented, to a reference voltage Vref. Moreover, this input 3 is also linked via a second impedance, namely the resistor R2, to the output 5 of the operational amplifier. Furthermore, the second input, namely the positive input 4, is linked to the point B common to the two additional buses and it is also connected across a first capacitor C2 to the output 5. In the embodiment of FIG. 3, the value of the compensation capacitor $C_1$ is equal to the sum of the values of the capacitors linking the additional bus or buses to each line of the matrix array.

The operation of the compensation circuit described above will now be explained.

In accordance with the present invention and as mentioned above, the value of the resistors and of the capacitors of the compensation circuit have been chosen in such a way that:

$$R1/R2 = C_2/C_1$$

given that $C_1$ is equal to:

$\Sigma(Cej + Ce'j)$ with j varying from 1 to m.

With the above arrangement, when the lines are capacitively disturbed by the columns, the arrangement of the operational amplifier means that the output 5 is modified in such a way as to take the line voltage to a value equal to the reference voltage, thereby enabling the imbalance to be compensated with the same bus (e, e').

The present invention has been described with two additional buses e, e' playing the same role. It is obvious to a person skilled in the art that the present invention can be applied to a circuit with a single additional bus e or e'.

What is claimed is:

1. A compensation process for a circuit comprising at least one first conductor at a specified potential, at least one second conductor generating disturbances by capacitive coupling to the at least one first conductor and at least one disturbance compensation bus capacitively coupled to the at least one first conductor by a first capacitor, comprising the steps of:

measuring a first voltage ($V_{comp}$) and a first current ($I_{comp}$) on the compensation bus;

calculating a second voltage ($V_{dist}$) applied on the at least one disturbed conductor, and determining a set point voltage to be applied to the same compensation bus used for measurement of the first voltage and the first current in order to compensate for the disturbance; wherein the value of the voltage on the at least one disturbed conductor is given by the following formula;

$$V_{dist} = \left( V_{comp} + \int \frac{I_{comp}}{C_t} dt \right)$$

and wherein the value of integral $\int I_{comp} dt$ is calculated from observation of the value of the voltage across the terminals of a second capacitor which is in series with the compensation bus and through which the same current $I_{comp}$ flows.

2. The process according to claim 1, wherein the second capacitor has a value greater than the value of the first capacitor.

3. A compensation process for a circuit comprising at least one first conductor at a specified potential, at least one second conductor generating disturbances by capacitive coupling to the at least one first conductor and at least one disturbance compensation bus capacitively coupled to the at least one first conductor by a first capacitor, comprising the steps of:

measuring a first voltage ($V_{comp}$) and a first current ($I_{comp}$) on the compensation bus;

calculating a second voltage ($V_{dist}$) applied on the at least one disturbed conductor, and determining a set point voltage to be applied to the same compensation bus used for measurement of the first voltage and the first current in order to compensate for the disturbance; wherein the value of the voltage on the at least one disturbed conductor is given by the following formula;

$$V_{dist} = \left( \int \frac{I_{comp}}{C_t} dt \right)$$

and wherein the compensation is effected by an analogue circuit comprising a resistive divider such that:

$$\frac{R_2}{R_1} = \frac{C_1}{C_2}$$

the divider being connected to an amplifier equalizing the voltages at the middle of the divider bridges.

4. A display screen comprising an array of electrodes arranged in matrix fashion in lines and in columns, a coupling capacitor being associated with each line/column crossing, line and column drive circuits and at least one additional conductor bus crossing all the lines and capacitively coupled to each of them in such a way that the corresponding coupling capacitance has a value of the same order of magnitude as the sum of the coupling capacitances between a line or a column and the columns or the lines which it crosses, and a compensation circuit for compensating for an imbalance due to the line/column capacitive couplings during drive phases, said compensation circuit having an input and an output both coupled to the same additional conductor bus.

5. The display screen according to claim 4, wherein the compensation circuit comprises an operational amplifier, a first input of which is linked across an impedance to a reference voltage, a second input of which is connected directly to the additional bus and the output of which is connected via a second impedance to the first input and via a second capacitor to the additional bus.

6. The display screen according to claim 5, wherein the ratio of the second impedance to the first impedance is substantially equal to the ratio of the sum of the capacitances coupling the additional bus with the lines or the columns to the second capacitance.

7. The display screen according to claim 4, wherein said at least one additional conductor bus comprises two additional buses placed at each end of the matrix array and linked one to the other at the input of the compensation circuit.

8. A compensation process for a circuit comprising at least one first conductor at a specified potential, at least one second conductor generating disturbances by capacitive coupling to the at least one first conductor and at least one disturbance compensation bus capacitively coupled to the at least one first conductor by a first capacitor, comprising the steps of:

measuring a first voltage ($V_{comp}$) and a first current ($I_{comp}$) on the compensation bus;

calculating a second voltage ($V_{dist}$) applied on the at least one second conductor, and determining a set point voltage to be applied to the same compensation bus used for measurement of the first voltage and the first current in order to compensate for the disturbance; wherein the value of the voltage on the at least one second conductor is given by the following formula;

$$V_{dist} = \left(V_{comp} + \int \frac{I_{comp}}{C_t} dt\right)$$

and wherein the value of integral $\int I_{comp} dt$ is calculated from observation of the value of the voltage across the terminals of a second capacitor which is in series with the compensation bus and through which the same current $I_{comp}$ flows.

9. A display screen comprising an array of electrodes arranged in matrix fashion in lines and in columns, a coupling capacitor being associated with each line/column crossing, line and column drive circuits and two additional conductor buses crossing all the lines and capacitively coupled to each of them in such a way that the corresponding coupling capacitance has a value of the same order of magnitude as the sum of the coupling capacitances between a line or a column and the columns or the lines which is crosses, and a compensation circuit for compensating an imbalance due to the line/column capacitive couplings during drive phases, said compensation circuit having an input and an output both coupled to the same additional conductor bus, wherein said two additional are linked one to the other at the input of the compensation circuit.

10. A display screen comprising an array of electrodes arranged in matrix fashion in lines and in columns, a coupling capacitor being associated with each line/column crossing, line and column drive circuits and at least one additional conductor bus crossing all the lines and capacitively coupled to each of them in such a way that the corresponding coupling capacitance has a value of the same order of magnitude as the sum of the coupling capacitances between a line or a column and the columns or the lines which it crosses, and a compensation circuit for compensating for an imbalance due to the line/column capacitive couplings during drive phases, said compensation circuit having an input and an output both coupled to the same additional conductor bus, the compensation circuit comprising an operational amplifier, a first input of which is linked across an impedance to a reference voltage, a second input of which is connected directly to the additional conductor bus and the output of which is connected via a second impedance to the first input and via a second capacitor to the additional bus, wherein the ratio of the second impedance to the first impedance is substantially equal to the ratio of the sum of the capacitances coupling the additional bus with the lines or the columns to the second capacitance.

\* \* \* \* \*